United States Patent
Chen et al.

(10) Patent No.: US 8,561,487 B2
(45) Date of Patent: Oct. 22, 2013

(54) TESTING APPARATUS FOR EXTENSION DEVICE

(75) Inventors: Fang-Yuan Chen, Shenzhen (CN); Shu-Qi Wu, Shenzhen (CN); Yang Chen, Shenzhen (CN); Yu-Lin Liu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 228 days.

(21) Appl. No.: 13/168,088

(22) Filed: Jun. 24, 2011

(65) Prior Publication Data

US 2012/0132016 A1 May 31, 2012

(30) Foreign Application Priority Data

Nov. 30, 2010 (CN) .......................... 2010 1 0566395

(51) Int. Cl.
*G01N 19/00* (2006.01)
*G01N 3/02* (2006.01)
*G01N 15/00* (2006.01)

(52) U.S. Cl.
USPC ............ 73/865.9; 73/856; 73/857; 73/865.8; 73/866.5

(58) Field of Classification Search
USPC ........ 73/865.8, 865.9, 866.5; 248/121, 122.1, 248/124.1, 124.2, 125.1, 125.8, 444, 448, 248/449
See application file for complete search history.

(56) References Cited

U.S. PATENT DOCUMENTS

| | | | | |
|---|---|---|---|---|
| 1,467,834 A * | 9/1923 | Bruch | ........................... | 248/514 |
| 4,292,748 A * | 10/1981 | Miller | ............................. | 38/102 |
| 4,378,646 A * | 4/1983 | Mazeika | ........................ | 38/102 |
| 5,253,554 A * | 10/1993 | Riera et al. | ...................... | 81/9.3 |
| 5,581,522 A * | 12/1996 | Sibuya et al. | ................ | 360/92.1 |
| 5,595,054 A * | 1/1997 | Reynolds de Sousa et al. | ............................ | 56/340.1 |
| 5,971,281 A * | 10/1999 | Frary et al. | ..................... | 235/487 |
| 6,138,909 A * | 10/2000 | Rockwell et al. | ............. | 235/383 |
| 6,427,336 B1 * | 8/2002 | Kojima et al. | .................. | 30/180 |
| 6,539,850 B1 * | 4/2003 | Parker | ............................. | 100/3 |
| 6,764,055 B1 * | 7/2004 | Lee | ................................. | 248/451 |
| 8,459,126 B2 * | 6/2013 | Chen et al. | ..................... | 73/856 |
| 2009/0060699 A1 * | 3/2009 | Arnold | .......................... | 414/729 |
| 2012/0210807 A1 * | 8/2012 | Huang et al. | ................. | 73/865.9 |

* cited by examiner

*Primary Examiner* — Leonard Chang
*Assistant Examiner* — Natalie Huls
(74) *Attorney, Agent, or Firm* — Altis & Wispro Law Group, Inc.

(57) ABSTRACT

A testing apparatus includes a support mechanism, a pushing device, and a clamping device secured to the driving member. The clamping device secures a product. The pushing device includes a guiding pipe, a driving member moveably attached to the guiding pipe, and an elastic member received in the guiding pipe. The elastic member is connected to a first end of the driving member. The first end of the driving member is received in the guiding pipe. The clamping device is secured to the driving member. Wherein the guiding pipe is adapted to receive air, the driving member is adapted to be driven by air to move along a first direction, and the elastic member is adapted to rebound to pull the driving member to move along a second direction opposite to the first direction.

16 Claims, 5 Drawing Sheets

TESTING APPARATUS FOR EXTENSION DEVICE

BACKGROUND

1. Technical Field

The present disclosure relates to a testing apparatus.

2. Description of Related Art

A product, such as a hard disk, is often electrically connected to an interface of an electronic device. The connection of the product and the interface of the electronic device should be tested to ensure reliability. The testing is usually done manually, which is labor intensive and time-consuming.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
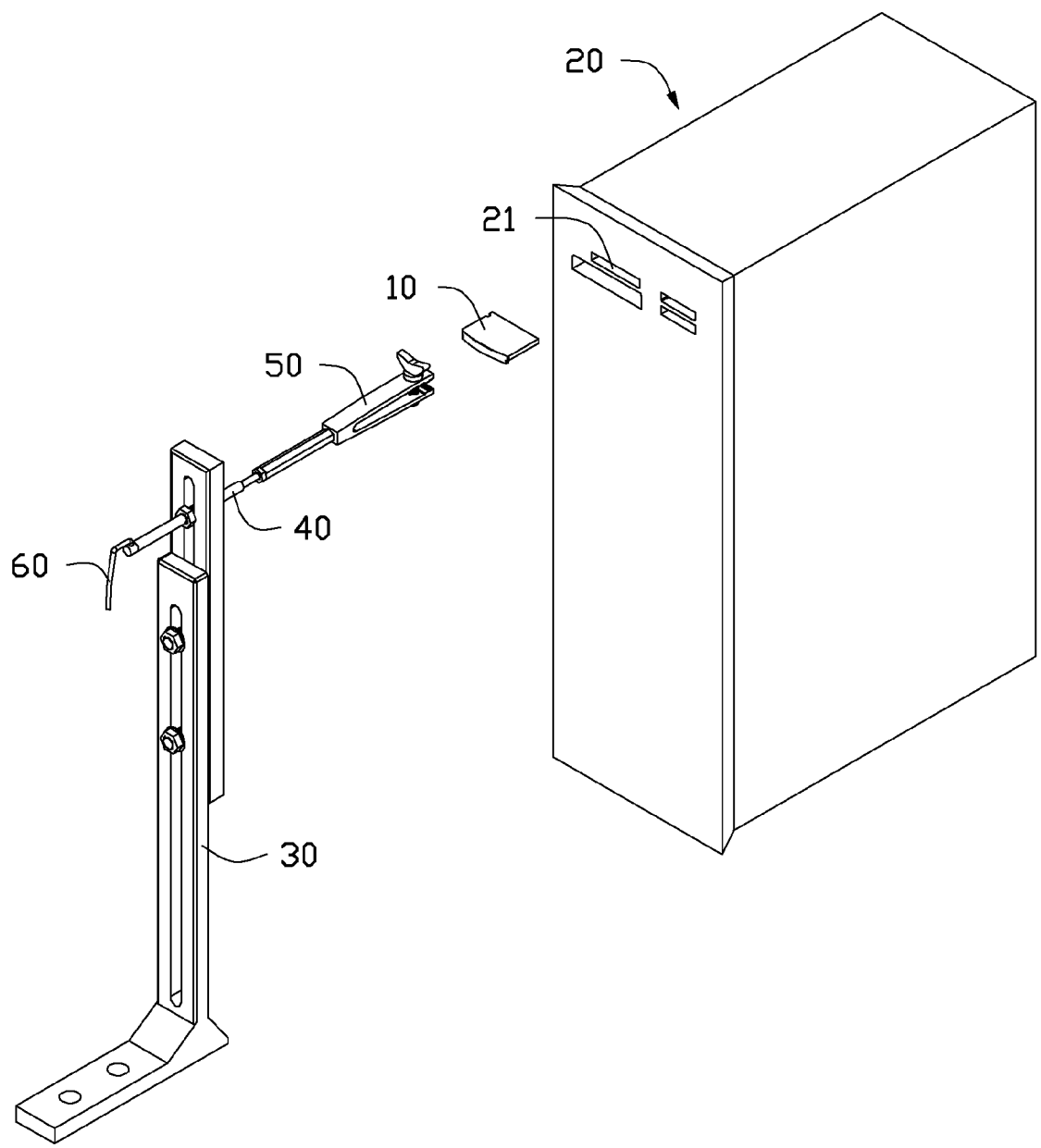
FIG. 1 is an exploded, isometric view of a testing apparatus and an electronic device in accordance with an embodiment.

Referring to FIG. 1, a testing apparatus in accordance with an embodiment includes a support mechanism 30, a pushing device 40 secured to the support mechanism 30, and a clamping device 50 mounted to the pushing device 40. The testing apparatus tests a product 10, an interface of which engaged with or is disengaged from an interface 21 of an electronic device 20. In one embodiment, the product 10 may be, for example, a hard disk, or a CD drive, and the electronic device 20 may be a computer.

Figure 2:
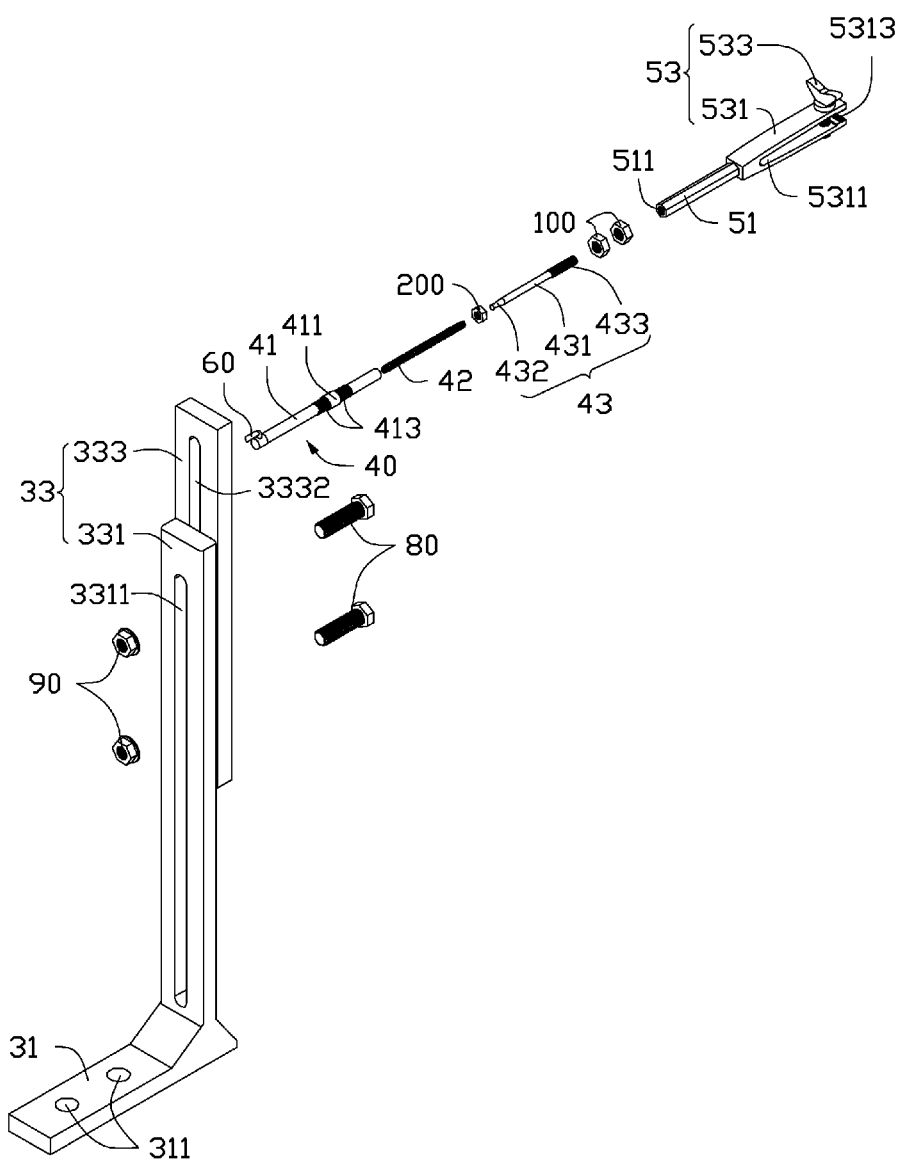
FIG. 2 is an exploded, isometric view of a testing apparatus in accordance with an embodiment.
Figure 3:
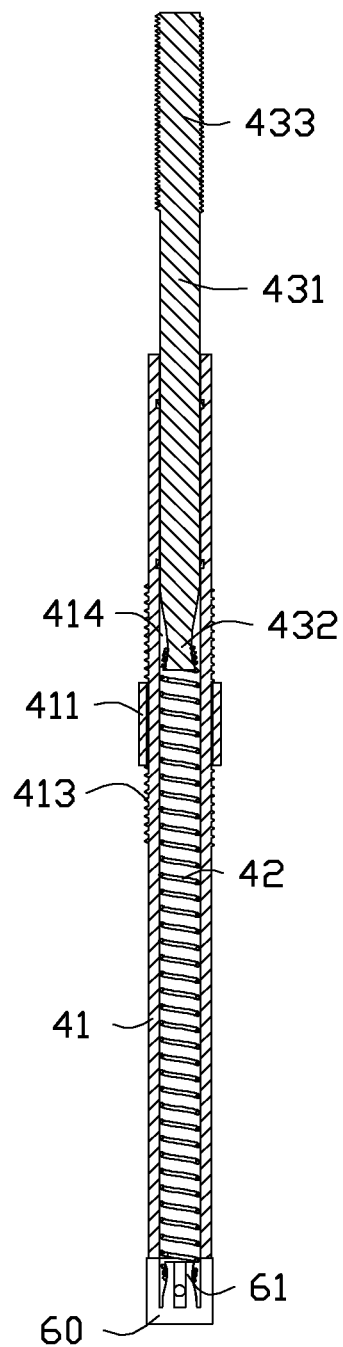
FIG. 3 is a cross-section view of a pushing device of the testing apparatus of FIG. 2.

Referring to FIGS. 2 to 3, the support mechanism 30 includes a base 31 and a securing member 33 connected to the base 31. Two base holes 311 are defined in the base 31. Two fixing members (not shown), such as screws, are engaged in the base holes 311 to secure the base 31 to a support surface (not shown), such as a surface of a desk. The securing member 33 includes a first securing plate 331 with a longitudinal securing hole 3311, and a second securing plate 333 with a longitudinal mounting hole 3332. The mounting hole 3332 is aligned with the securing hole 3311. One of ordinary skill in the art will also realize that the present disclosure is not limited to the configuration of the securing member 33. Rather, other configurations are contemplated by the present disclosure, for example, a slide-rail.

Referring to FIGS. 2 and 3, the pushing device 40 includes a guiding pipe 41, an elastic member 42, and a driving member 43 being moveably received in the guiding pipe 41. In one embodiment, the elastic member 42 is a spring. A protrusion 411 protrudes from the guiding pipe 41, and two retaining portions 413 with threads are located on two opposite sides of the protrusion 411. The retaining portions 413 are secured to the first securing plate 331 or the second securing plate 333. A through hole 414 is defined by the guiding pipe 41 in a longitudinal direction. The driving member 43 includes a driving body 431, a connecting portion 432, and a securing portion 433. The connecting portion 432 and the securing portion 433 extend from opposite ends of the driving body 431. The driving member 43 can be received in the through hole 414. A diameter of a center of the connecting portion 432 is less than that of two ends of the connecting portion 432.

The guiding pipe 41 is connected to an air output pipe 60. The air output pipe 60 includes a securing part 61. The securing part 61 is received in the guiding pipe 41. A terminal of the elastic member 42 is connected to the securing part 61. The other terminal of the elastic member 42 is connected to the connecting portion 432 of the driving member 43.

The clamping device 50 includes a mounting shaft 51 with a screw hole 511 and a positioning member 53 connected to the mounting shaft 51. The positioning member 53 includes a V-shaped clamping element 531 connected to the mounting shaft 51 and an adjusting element 533. The clamping element 531 includes two clamping arms 5311. Each clamping arm 5311 defines a plurality of teeth slots 5313 at a free end of the each clamping arm 5311. The adjusting element 533 is used for connecting the two free ends of the two clamping arms 5311 and adjusting a distance between the two free ends of the two clamping arms 5311.

Figure 4:
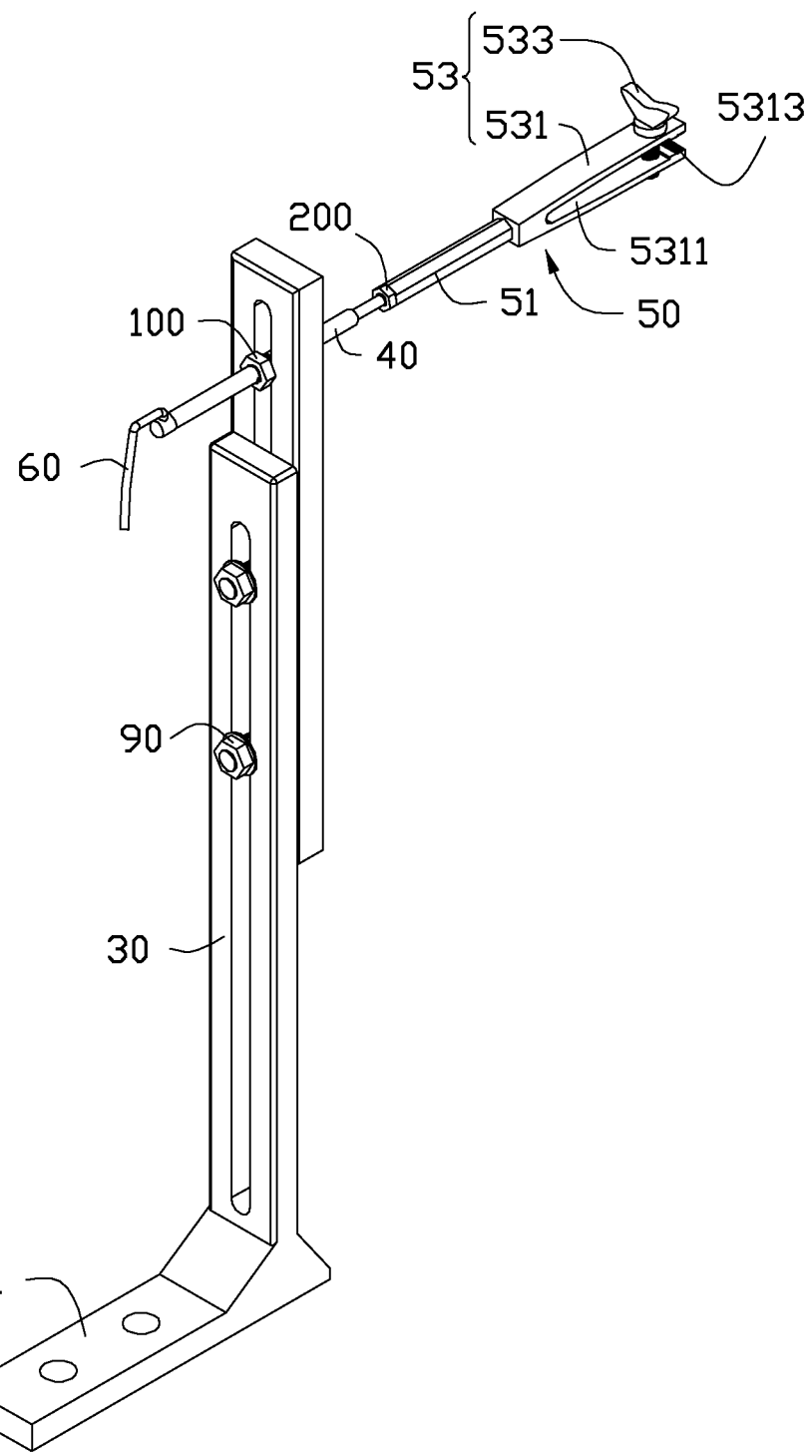
FIG. 4 is an assembled view of FIG. 2.

Referring to FIG. 4, in assembly, the second securing plate 333 abuts the first securing plate 331, with the mounting hole 3332 aligned with the securing hole 3311. Two fasteners 80 are passed through the mounting hole 3332 and the securing hole 3311, and two first nuts 90 are engaged with the two fasteners 80. The second securing plate 333 is thereby secured to the first securing plate 331.

The guiding pipe 41 of the pushing device 40 is passed through the mounting hole 3332, with the protrusion 411 abutting the second securing plate 333. Two second nuts 100 are engaged with the two retaining portions 413, and the guiding pipe 41 is thereby mounted to the second securing plate 333. A terminal of the elastic member 42 is connected to the connecting portion 432 in an interference fit. The elastic member 42 and the driving member 43 are received in the through hole 414 of the guiding pipe 41. The other terminal of the elastic member 42 is connected to the securing part 61 of the air output pipe 60 in an interference fit. The air output pipe 60 is connected to the guiding pipe 41. A third nut 200 is engaged with the securing portion 433. The securing portion 433 is engaged in the mounting shaft 51. At this time, a terminal of the elastic member 42 is secured to the air output pipe, and the other terminal of the elastic member 42 is secured to the driving member 43. In one embodiment, the elastic member 42 is in a free status.

Figure 5:
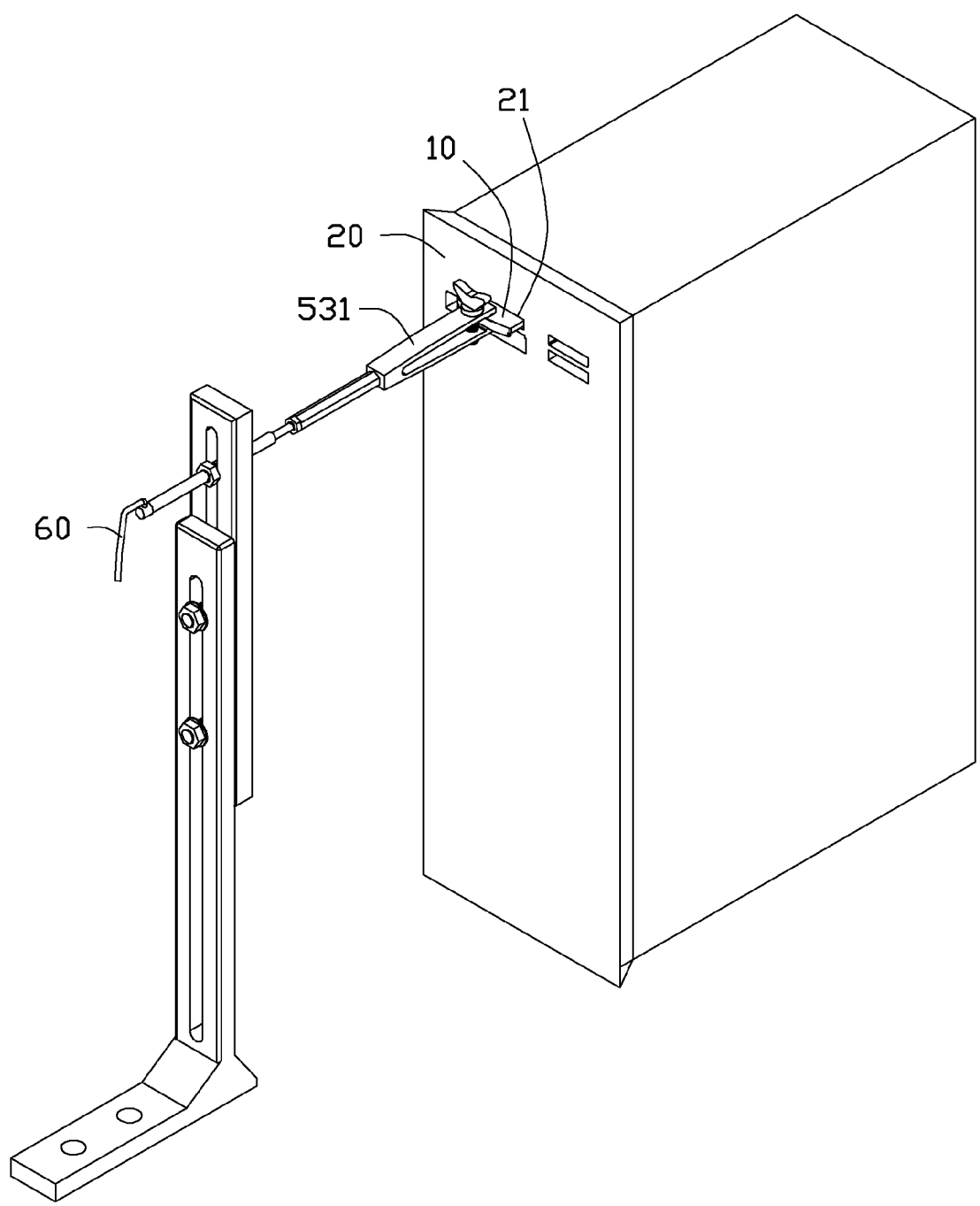
FIG. 5 is an assembled view of FIG. 1.

Referring to FIG. 5, in testing, the adjusting element 533 is rotated to adjust a distance between two free ends of the clamping arms 5311 to clamp the product 10. At this time, the product 10 is aligned with an interface 21 of an electronic device 20.

Air is filled in the air output pipe 60. Power provided by air pressure is applied to drive the driving member 43 to move close to the electronic device 20 along a first direction until the product 10 is inserted in the interface 21 of the electronic device 20. At this time, the elastic member 42 is elastically deformed.

When the power applied to the driving member 43 is removed, the elastic member 42 rebounds to pull the driving member 43 to move in a second direction, opposite to the first direction, to disengage the product from the interface 21 of the electronic device 20.

The above mentioned testing steps are repeated, and a testing result will be obtained.

In addition, the pushing device 40 can be mounted to the securing member 33 in different positions.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A testing apparatus comprising:
a pushing device comprising a guiding pipe, a driving member moveably attached to the guiding pipe, and an elastic member received in the guiding pipe, the elastic member connected to a first end of the driving member, the first end of the driving member received in the guiding pipe;
a clamping device, secured to the driving member; and
a support mechanism, the support mechanism comprising a base and a securing member connected to the base; the securing member comprising a first securing plate and a second securing plate; the first securing plate defining a first longitudinal securing hole and the second securing plate defining a second longitudinal securing hole aligned with the first longitudinal securing hole; the second securing plate is attachable to different positions of the first securing plate when the first longitudinal securing hole is aligned with different positions of the second longitudinal securing hole; and the second securing plate securing the guiding pipe;
wherein the guiding pipe is adapted to receive air, the driving member is adapted to be driven by air to move along a first direction, and the elastic member is adapted to rebound to pull the driving member to move along a second direction opposite to the first direction; a protrusion protrudes from the guiding pipe, and two retaining portions with threads are located on two opposite sides of the protrusion; the protrusion is placed in the second longitudinal securing hole; two nuts are engaged with the two retaining portions to secure the guiding pipe to the second securing plate; and the second securing plate is located between the two nuts.

2. The testing apparatus of claim 1, wherein the clamping device comprises a clamping element and an adjusting element mounted to the clamping element, the adjusting element adapted to be rotated to adjust the clamping element.

3. The testing apparatus of claim 2, wherein the clamping element comprises two clamping arms connected to each other, the adjusting element mounted to the two clamping arms, the adjusting element adapted to adjust a distance between two free ends of the two clamping arms.

4. The testing apparatus of claim 3, wherein each clamping arm defines a plurality of teeth slots.

5. The testing apparatus of claim 2, wherein the clamping element is V-shaped.

6. The testing apparatus of claim 2, wherein the clamping device further comprises a mounting shaft connected between the clamping element and the driving member, the driving member comprising a securing portion secured in the mounting shaft.

7. The testing apparatus of claim 1, wherein the driving member comprises a connecting portion connected to the elastic member, and a cross-section of a center of the connecting portion is less than a cross-section of each end of the connecting portion.

8. The testing apparatus of claim 1, further comprising an air output pipe connected to the guiding pipe; wherein the air output pipe comprises a securing portion received in the guiding pipe, and the elastic member is connected between the driving member and the securing portion.

9. An electronic device assembly, comprising:
an electronic device, the electronic device defines an interface; and
a testing apparatus, the testing apparatus comprising:
a pushing device comprising a guiding pipe, a driving member moveably attached to the guiding pipe, and an elastic member received in the guiding pipe, the elastic member connected to a first end of the driving member, the first end of the driving member received in the guiding pipe;
a clamping device, secured to the driving member, the clamping device adapted to secure a product; and
a support mechanism, the support mechanism comprising a base and a securing member connected to the base; the securing member comprising a first securing plate and a second securing plate; the first securing plate defining a first longitudinal securing hole and the second securing plate defining a second longitudinal securing hole aligned with the first longitudinal securing hole; the second securing plate is attachable to different positions of the first securing plate when the first longitudinal securing hole is aligned with different positions of the second longitudinal securing hole; and the second securing plate securing the guiding pipe;
wherein the guiding pipe adapted to receive air; the driving member is adapted to be driven to move along a first direction to enable the product to be inserted in the interface; the elastic member is adapted to rebound to pull the driving member to move along a second direction opposite to the first direction to enable the product to disengage from the interface; a protrusion protrudes from the guiding pipe, and two retaining portions with threads are located on two opposite sides of the protrusion; the protrusion is placed in the second longitudinal securing hole; two nuts are engaged with the two retaining portions to secure the guiding pipe to the second securing plate; and the second securing plate is located between the two nuts.

10. The electronic device assembly of claim 9, wherein the clamping device comprises a clamping element adapted to clamp the product and an adjusting element mounted to the clamping element, the adjusting element adapted to be rotated to adjust the clamping element to clamp the product tightly or loosely.

11. The electronic device assembly of claim 10, wherein the clamping element comprises two clamping arms connected each other adapted to clamp the product therebetween, the adjusting element mounted to the two clamping arms, the adjusting element adapted to adjust a distance between two free ends of the two clamping arms to clamp the product tightly or loosely.

12. The electronic device assembly of claim 11, wherein each clamping arm defines a plurality of teeth slots adapted to clamp the product.

13. The electronic device assembly of claim 10, wherein the clamping element is V-shaped.

14. The electronic device assembly of claim 10, wherein the clamping device further comprises a mounting shaft connected between the clamping element and the driving member, the driving member comprising a securing portion secured in the mounting shaft.

15. The electronic device assembly of claim 9, wherein the driving member comprises a connecting portion connected to the elastic member, and a cross section of a center of the connecting portion less than a cross section of each end of the connecting portion.

16. The electronic device assembly of claim 9, further comprising an air output pipe connected to the guiding pipe; wherein the air output pipe comprises a securing portion received in the guiding pipe, and the elastic member connected between the driving member and the securing portion.

* * * * *